United States Patent [19]

Hege et al.

[11] Patent Number: 5,321,586

[45] Date of Patent: Jun. 14, 1994

[54] LIGHTING DEVICE FOR A VEHICLE HAVING AT LEAST ONE CENTRAL LIGHT SOURCE

[75] Inventors: Guenter Hege, Gomaringen; Rainer Neumann, Stuttgart; Alfred Bruder, Gerlingen; Helmut Sautter, Ditzingen, all of Fed. Rep. of Germany

[73] Assignee: Robert Bosch GmbH, Stuttgart, Fed. Rep. of Germany

[21] Appl. No.: 806,881

[22] Filed: Dec. 12, 1991

[30] Foreign Application Priority Data

Dec. 14, 1990 [DE] Fed. Rep. of Germany ....... 4040020

[51] Int. Cl.$^5$ .............................................. F21Y 8/00
[52] U.S. Cl. ........................................ 362/32; 362/61; 362/227; 362/297
[58] Field of Search ............... 362/32, 61, 80, 83.3, 362/227, 237, 241, 296, 297, 298, 300, 310, 346

[56] References Cited

U.S. PATENT DOCUMENTS

| | | | |
|---|---|---|---|
| 4,241,382 | 12/1980 | Daniel | 362/32 |
| 4,389,698 | 6/1983 | Cibie | 362/32 |
| 4,459,643 | 7/1984 | Mori | 362/32 |
| 4,460,939 | 7/1984 | Murakami et al. | 362/32 |
| 4,613,927 | 9/1986 | Brandt | 362/32 |
| 4,740,870 | 4/1988 | Moore et al. | 362/32 |
| 4,811,171 | 3/1989 | Viola | 362/32 |
| 4,930,049 | 5/1990 | Davenport et al. | 362/32 |
| 4,958,263 | 9/1990 | Davenport et al. | 362/32 |
| 4,977,487 | 12/1990 | Okano | 362/32 |

*Primary Examiner*—Richard R. Cole
*Attorney, Agent, or Firm*—Michael J. Striker

[57] ABSTRACT

The lighting device for a vehicle has at least one central reflector (10), which is formed as a substantially closed hollow body. The reflector (10) is formed from two reflector parts (11, 12), which have light outlet openings facing each other. The reflector parts (11, 12) are shaped like portions of an ellipsoid of revolution and are arranged so that their first focal points (F1) coincide and their second focal points (F2) lie on the peak of the opposing reflector part (11, 12). The light emitting body (16) of the light source is arranged in the vicinity of the first focal points (F1). Because of this structure of the reflector (10) almost all of the light issuing from the light emitting body (16) is concentrated on the second focal points (F2) of the reflector parts. A light guide (18) is positioned to guide light away from each reflector part in the vicinity of its second focal point (F2). The light guide (18) conducts the light entering its end portion connected to the reflector (10) to a vehicle light outlet unit (19). The vehicle light outlet units (19) can have their own reflector (21) for collection and formation of the light beam from the light issuing from the light guide (18).

8 Claims, 4 Drawing Sheets

LIGHTING DEVICE FOR A VEHICLE HAVING AT LEAST ONE CENTRAL LIGHT SOURCE

BACKGROUND OF THE INVENTION

The present invention relates to a lighting device or lighting system for a vehicle and, more particularly, to a lighting device having at least one central light source and a plurality of light outlet units.

A lighting device for a vehicle is known, comprising at least one central reflector, which is formed as a substantially hollow body, a light source whose light emitting body extends inside the reflector, and a plurality of light guides which conduct light from the periphery of the reflector for transmission to vehicle light outlet units.

This kind of lighting device is known from European Patent Application EP-A2-0 367 032. This lighting device has a central reflector, which is formed as a substantially hollow body. This lighting device also has a light source whose light emitting body is located inside the reflector. The reflector is formed by a jacket of the light source, which is provided with a reflective coating. The light source is formed as a gas discharge lamp, whose electrodes project into the reflector. The light emitting body extends between the electrodes in the form of an electric arc. Several light guide connectors are connected to the periphery of the reflector. The reflector transmits light in the vicinity of the light guide connectors. The light guide connectors are distributed uniformly around the periphery of the reflector on a section through the reflector. The light guide connectors can only receive light transmitted directly from the light emitting body of the light source to them and, in the case of a spherical reflector, the light guide connectors can also receive light transmitted from portions of the reflector opposite from the light emitting body and reflected light to the light guide connectors. A desirable reflection of light to the light guide connectors is not possible with this structure of the reflector, since a substantial portion of the light reflected by the reflector cannot enter into the light guide connectors. Light guides are connected to the light guide connectors, which lead to vehicle light outlet units. The vehicle light outlet units have lenses for collecting and collimating the light conducted to them by the light guides. It is however difficult to collect the entire light issuing from the light guides in a certain angular range with the lenses.

The light guide connectors on the reflector have a circular cross section. The image of the light emitting body reflected by the reflector has however, as the light emitting body, an elongated form, so that the lighting device has an intrinsically poor efficiency.

SUMMARY OF THE INVENTION

It is an object of the present invention to provide a centralized lighting system for a vehicle of the above described type in which the above described disadvantages are eliminated.

It is also an object of the present invention to provide a central lighting device for a vehicle of the above-described kind, in which the total amount of the light emitted by the light source and light reflected by the reflector can enter the light guides and thus the efficiency of the lighting device is improved.

These objects and others which will become more apparent hereinafter are attained in a lighting device for a vehicle comprising a plurality of vehicle light outlet units, at least one central reflector formed as a nearly closed hollow body, a light source having a light emitting body extending inside the reflector and a plurality of light guides leading away from the periphery of the reflector to transport light to the vehicle light outlet units, advantageously connected to the reflector so as to guide light produced by the light source away from the reflector.

According to the present invention, the reflector comprises a plurality of reflector parts, each of the reflector parts having a first and second focal point. The reflector parts are positioned so that the first focal points of all the reflector parts coincide and are located in the vicinity of the light emitting body and the second focal point of each of the reflector parts lies at least approximately on a surface of at least one of the other reflector parts. The light guides are advantageously connected to the reflector parts in the vicinity of the second focal points so as to guide light away from the reflector.

The lighting device according to the invention has the advantage that nearly all of the light reflected by the reflector enters the light guides and thus the efficiency of the lighting device is substantially improved.

When, in preferred embodiments of the lighting device of the invention, the reflector has an even number of said reflector parts and the second focal points of the reflector parts lie on peaks of the reflector parts positioned opposite thereto, an optimum efficiency of the lighting device is obtained. Similarly optimum efficiency can be obtained, when the reflector has an odd number of the reflector parts, and the second focal point of each reflector part is positioned at a discontinuity or joint between both of the reflector parts located opposite to it.

Additional improvement in lighting efficiency can be attained when the light emitting body of the light source has an elongated shape, and the light guides have end portions having elongated cross-sections adjusted to match the shape of the light emitting body.

The light issuing from the light guides can be best utilized by the light outlet units of the vehicle, when the vehicle light outlet units connected with the central reflector by the light guides each have a reflector (21) designed to collect a maximum amount of the light from the light guides and radiate it as a nearly collimated beam of light.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
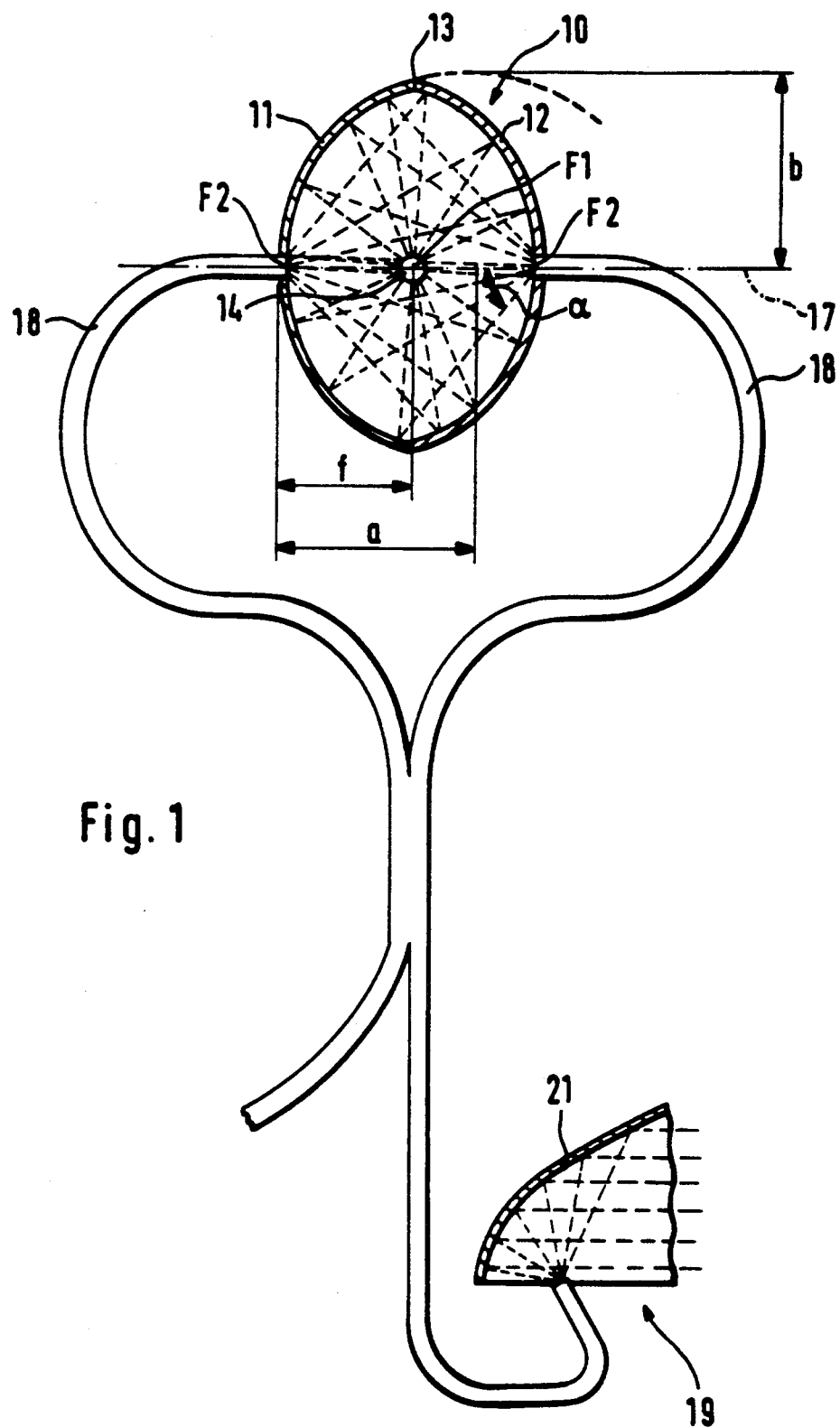
FIG. 1 is a schematic cross-sectional view of a first embodiment of a lighting device according to the invention.

A first embodiment of a lighting device of a vehicle shown in FIG. 1 has a reflector 10 located in a central location in the vehicle. The reflector 10 comprises two reflector parts 11 and 12, which are each located diametrically opposite each other and are provided with light openings opposite each other. These two reflector parts 11, 12 together form a substantially closed hollow body. Both reflector parts 11, 12 are portions of an ellipsoid of revolution and are arranged so that the first focal point F1 of both reflector parts coincides. A discontinuity 13 is located at the transitional points between both reflector parts. A light source 14, which can be a gas discharge tube or a light bulb, is located inside the reflector 10. The light emitting body 16, which can be a suitable filament or an arc, extends in the vicinity of the common first focal point F1 of the reflector parts 11, 12.

The second focal point F2 of the reflector part 11, 22 is positioned on the surface of the other reflector part 12, 11 on its peak or tip. The rotation axis 17 of the ellipsoid of revolution forming the reflector parts 11, 12 coincides with the connecting line of the first and second focal points F1 and F2. Light beams emitted from the light emitting body 16 are reflected by the reflector parts 11, 12 and concentrated at the second focal point F2.

The equation of the ellipse, by whose rotation the ellipsoid of rotation forming the reflector parts 11, 12 is generated, has the following general formula (1):

$$x^2/a^2 + y^2/b^2 = 1 \quad (1)$$

wherein
 a = major semiaxis of the ellipse
 b = minor semiaxis of the ellipse
 x = x-coordinate
 y = y-coordinate.

The numerical eccentricity e of the ellipse is defined as follows:

$$e = c/a \quad (2)$$

wherein $c = \sqrt{a^2 - b^2}$.

The focal length f of the ellipse is defined as the distance between the peak and the focal point:

$$f = a - c \quad (3)$$

The construction of the reflector 10 from both reflector parts 11, 12 with coincident first focal points F1 and with their second focal points F2 lying on the peaks of the other reflector part requires a numerical eccentricity e of the ellipsoid of revolution of 0.3. In the design of the reflector a focal length f suitable for headlight reflectors is selected, with which the most uniform possible illumination is attained. With equations (2) and (3) the size of major semiaxis a of the ellipse can be calculated from the chosen focal length and the required numerical eccentricity e = 0.3. The minor semiaxis b of the ellipse then is determined by the numerical eccentricity e. Furthermore, the angle α, within which the reflected light beams can deviate from the normal to the peak of the ellipsoid of revolution and impinge on the second focal point F2, is also determined by the numerical eccentricity e of the ellipsoid of revolution. The angle α = 53.13°, when the numerical eccentricity e = 0.3 and the reflector 10 is constructed from two reflector parts 11, 12.

The reflector parts 11, 12 have an opening at their peak in the vicinity of the second focal point F2, through which the end of the light guide 18 is inserted. Almost the total amount of the light issuing from the light emitting body 16 is concentrated by the reflector parts 11, 12 on the second focal point F2 and thus on the light guide ends. In order to be able to conduct the entire amount of the light falling within the angle α to the perpendicular on the facing end of the light guides, the light guide must have a suitable size aperture at this point. The numerical value of the aperture is determined by the physical properties of the light guide material. To be able to use the entire light issuing thereon, the numerical value of the aperture must be at least as large as the sine of the angle α, in the present example this amounts 0.8. This value is attainable with known material used for making light guides.

The light guide 18 conducts the light from the central reflector 10 to the vehicle light outlet units 19, of which only one is shown in FIG. 1. By the term "vehicle lights" we mean headlights, signal lights, interior lights and signal lights. The light guide 18 extends into the vehicle light outlet unit 19 and acts as a light source therein. The vehicle light outlet unit 19 has a reflector 21 for collection and forming a directed beam of the light issuing from the light guide 18. The reflector 21 can be formed for example by a paraboloid of revolution. In a suitable arrangement of the light guide in the light outlet unit 19 a half of the paraboloid of rotation is sufficient for collection of the entire light.

Figure 2:
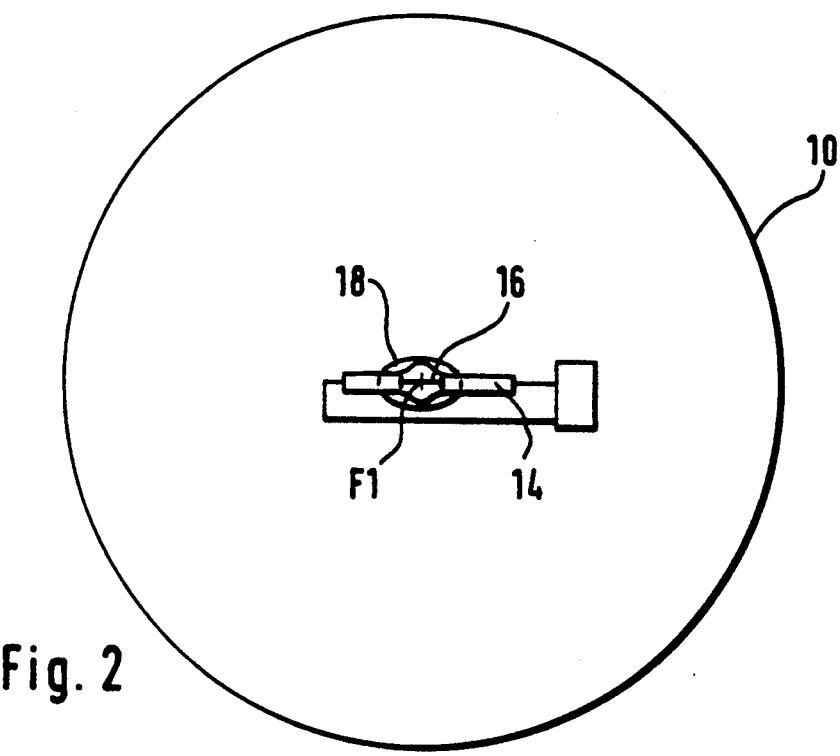
FIG. 2 is a schematic transverse cross-sectional view through a reflector of the lighting device of FIG. 1.

The cross-section of the light guide is, as seen from FIG. 2, formed elongated, e.g. elliptical or rectangular, at least in its end portion connected to the reflector, so as to fit the elongated extent of the light emitting body 16 of the light source. The use of gas discharge tubes in contrast to light bulbs has the advantage that the arc can have a smaller surface area than the filament of the light bulb. Furthermore gas discharge light sources have a reduced infrared component in their emission spectra compared to the light bulb, so that the reflectors and light guides are not heated as much when the discharge light sources are used. A protective filter, the formation of the reflector as a cold light mirror and/or a temperature resistant structure for the light guides is required when light bulbs are used as light source. The light guide 18 is constructed from a plurality of individual fibers, e.g. glass fibers or plastic fibers, which are combined with each other, for example which are interlinked. The end portions of the light guides leading away from the central reflector 10 are attached in holder. The attachment of the individual fibers in the holder can occur by temperature resistant adhesive, glass or metal solder or also by an adhesive-free, purely mechanical pressing. The light guide 18 can, as shown in FIG. 1, be combined at a distance from the reflector and further also branched out to supply several vehicle light outlet units.

Figure 3:
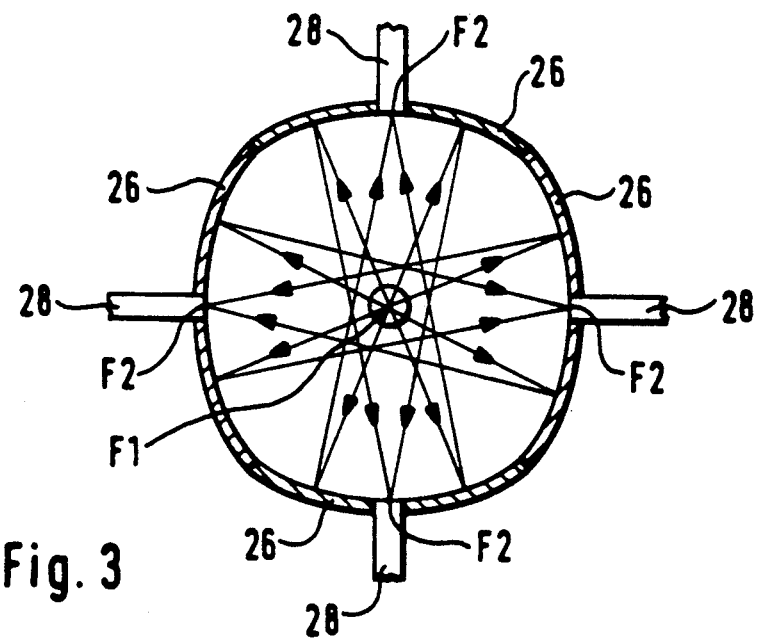
FIG. 3 is a schematic transverse cross-sectional view through a reflector of a second embodiment of a lighting device according to the invention.

Another embodiment of the invention is shown in FIG. 3 having a different form of the reflector from that of FIG. 1. In this embodiment there are four reflector parts 26. The four reflector parts 26 are arranged in pairs and each pair has two reflector parts positioned diametrically opposite to one another. Each of the reflector parts is a portion of an ellipsoid of revolution. The first focal points F1 of the reflector parts 26 coincide. The ellipsoid of revolution forming the reflector part 26 has as described for the first embodiment a numerical value of eccentricity e=0.3. Each light guide 28 is connected at the peak of the reflector part 26. The angular range, in which the light rays reflected by the reflector parts 26 impinge on the light guides, is substantially smaller compared to the reflector of FIG. 1 with only two reflector parts 11, 12, so that the light guides 28 need a smaller numerical value of aperture and can be made from more economical material.

The reflector 10 can be made from any even integral number of reflector parts—extending the concept of the invention as described above, as long as all reflector parts have a common first focal point F1 and the second focal point F2 of each reflector part lies on the peak of the reflector part directly across from the reflector part associated therewith. Also the light guide must be connected at the peak of the reflector part.

Figure 4:
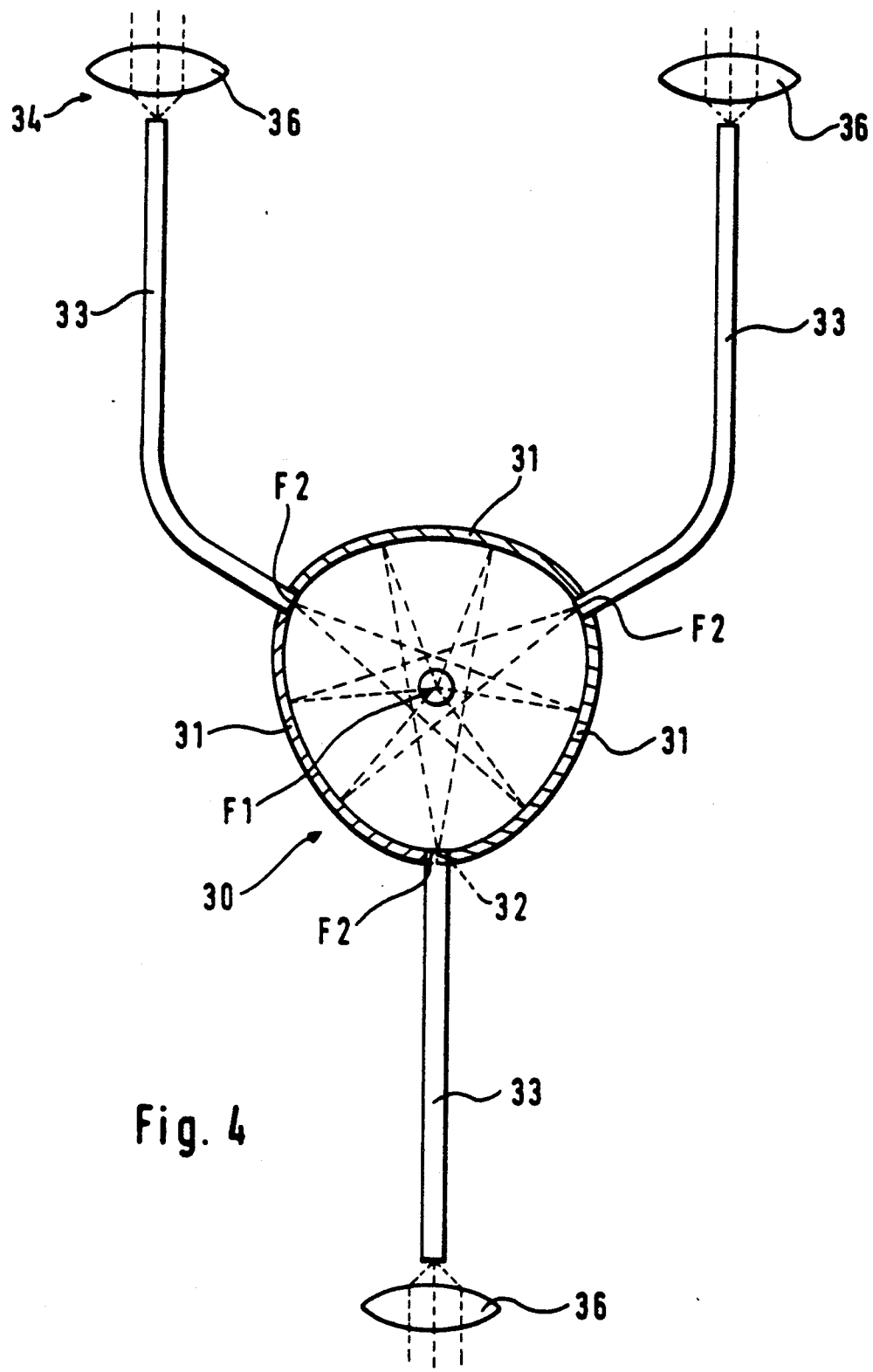
FIG. 4 is a schematic cross-sectional view of a third embodiment of a lighting device according to the invention.

In a third embodiment shown in FIG. 4 the light device of the invention has a central reflector 30 made from three reflector parts 31. The reflector part 31 is a portion of an ellipsoid of revolution. The first focal points F1 of all three reflector parts 31 coincide and the second focal points F2 of each reflector lies on the joint or discontinuity 32 formed between the two other reflector parts 31. The rotation axis of the ellipsoid of revolution coincides with the connection line between the first and second focal points. A light guide 33 is connected at each of the joints 32 between the reflector parts 31 in the vicinity of the second focal point F2. The light emitting body 16 of the light source 14 is arranged in the vicinity of the common first focal point of the reflector part 31. In this form of the reflector 30 similarly reflected light from each reflector part 31 is concentrated on the second focal points F2 and enters there into the light guide 33. In a further extension of the concept of the invention, the reflector 30 can be formed from a odd number of reflector parts, which all have a common first focal point F1. The second focal points F2 all lie on a joint between adjoining reflector parts and light guides are connected to the joints in the vicinity of second focal points F2. The vehicle light outlet units 34 have in this third embodiment, in contrast to the first embodiment, lenses 36 for collection and beam formation from the light issuing from the light guides 33. However, it is difficult to collect with the lenses 36 all light issuing from the light guides 33, since they would necessarily have either a very small focal length or a very large diameter. The comparatively higher aperture, i.e. the spanning of a greater spatial angle, which is required for collection of all the light, is more easily obtained with the light outlet units 19 with reflectors 21 described in connection with the first embodiment than with this third embodiment.

Figure 5:
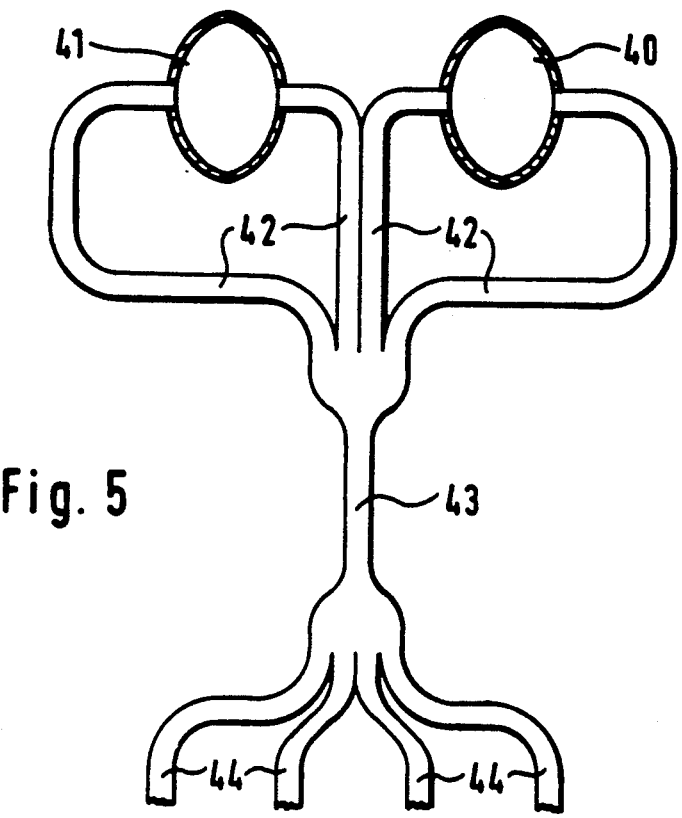
FIG. 5 is a diagrammatic cross-sectional view of a fourth embodiment of a lighting device according to the invention.
Figure 6:
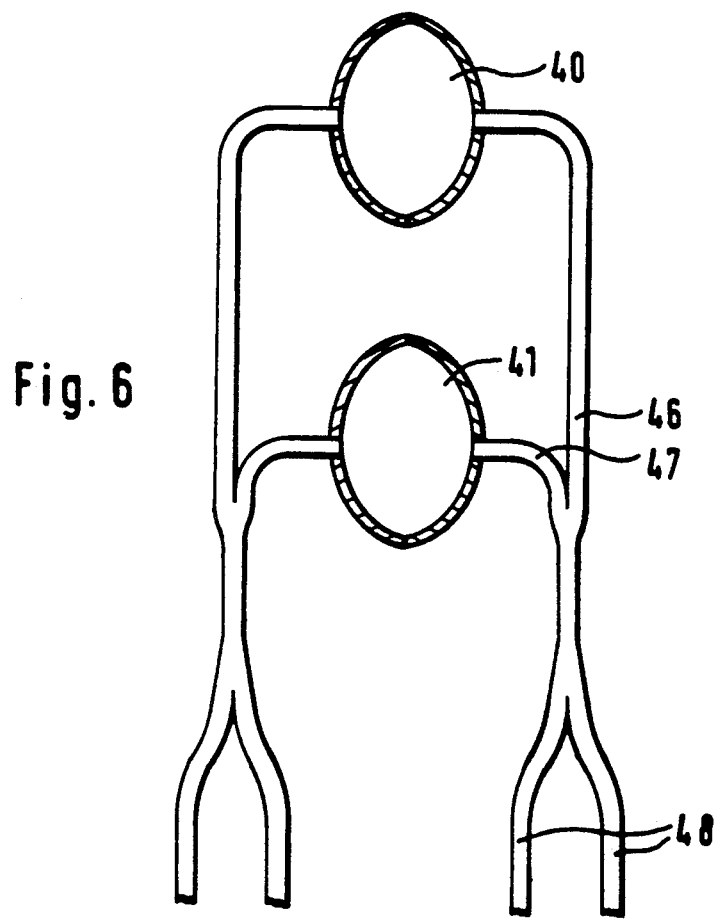
FIG. 6 is a diagrammatic cross-sectional view of a fifth embodiment of a lighting device according to the invention.

In FIGS. 5 and 6 a fourth and fifth embodiment of the lighting device according to the invention are shown, in which two separate reflectors 40 and 41 are provided, each of which are formed like the reflector of the first embodiment.

In the fifth embodiment of the lighting device according to the invention shown in FIG. 5 all the light guides 42 leading from both reflectors 40, 41 can be combined into a single light guide section 43, which itself branches into a plurality of light guides leading to the vehicle light outlet units. In this way the vehicle light outlet units are combined with both reflectors 40, 41, so that in case of failure of one of the light sources in one of the reflectors, there isn't a complete failure of the lighting device, but only a reduction in illuminating power.

In the fifth embodiment shown in FIG. 6 light guide 46 leading away from the first reflector 40 and light guide 47 leading away from the second reflector 41 are brought together in a common light guide and subsequently branched into light guides 48 leading to different light outlet units. Also here every light guide is connected with both reflectors, so that in case one light source fails, light will still be supplied to the vehicle light outlet units.

It will be understood that each of the elements described above, or two or more together, may also find a useful application in other types of constructions differing from the types described above.

While the invention has been illustrated and described as embodied in a lighting device for a vehicle having a central light source, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a lighting device for a vehicle, said lighting device comprising a plurality of vehicle light outlet units (19; 34), at least one central reflector (10; 30) formed as a nearly closed hollow body, a light source (14) having a light emitting body (16) extending inside the reflector (10; 30) and a plurality of light guides (18; 33) leading away from the reflector for conducting light produced by the light source to the vehicle light outlet units (19, 34), the improvement wherein the reflector (10; 30) comprises a plurality of reflector parts (11; 26; 31) each of which have a first focal point (F1) and a second focal point (F2), and said reflector parts are positioned so that the first focal points (F1) of all the reflector parts coincide and are located in the vicinity of the light emitting body (16) and the second focal point (F2) of each of the reflector parts (11; 26; 31) is located at least approximately on a surface of at least one of the other reflector parts (11; 26; 31), and wherein the light guides (18; 33) are positioned in the vicinity of the second focal points (F2) to guide light away from the reflector parts (11; 26; 33).

2. The improvement as defined in claim 1, wherein the reflector parts (11; 26; 31) are shaped like portions of an ellipsoid of revolution having a rotation axis (17) coinciding with a connecting line between the first focal point (F1) and the second focal point (F2).

3. The improvement as defined in claim 2, wherein the ellipsoid of revolution has a numerical eccentricity of 0.3.

4. The improvement as defined in claim 3, wherein the reflector comprises an even number of said reflector parts (11; 26) and the second focal point (F2) of each of said reflector parts (11; 26) is located on a peak of another of the reflector parts located opposite thereto.

5. The improvement as defined in claim 1, wherein the reflector (30) has an odd number of the reflector parts (31), and the second focal point (F2) of each reflector part (31) is located at a discontinuity between both of two other reflector parts positioned opposite thereto.

6. The improvement as defined in claim 1, wherein the light emitting body (16) of the light source (14) has an elongated shape, and the light guides (18; 33) have end portions connected to the reflector (10; 30) and the end portions have elongated cross-sections adjusted to match the shape of the light emitting body (16).

7. The improvement as defined in claim 1, wherein each of the vehicle light outlet units (19) connected with the central reflector by one of the light guides (18; 33) has an outlet unit reflector (21) shaped and positioned relative to the light guide connected thereto so as to collect the light issuing from the light guide connected thereto over a predetermined range of angles and produce a predetermined light intensity distribution.

8. The improvement as defined in claim 1, wherein said lighting device comprises at least two of said central reflectors (40, 41), and wherein the vehicle light outlet units (19) are connected by the light guides with the at least two central reflectors (40, 41).

* * * * *